Dec. 29, 1925.  1,567,110
F. G. W. BRISTOW
SHEEP SHEAR
Filed April 9, 1925  2 Sheets-Sheet 2
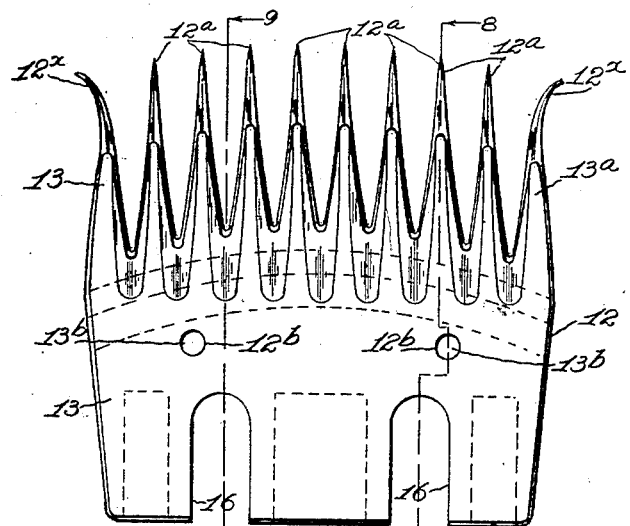
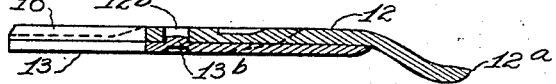
 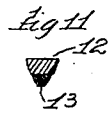
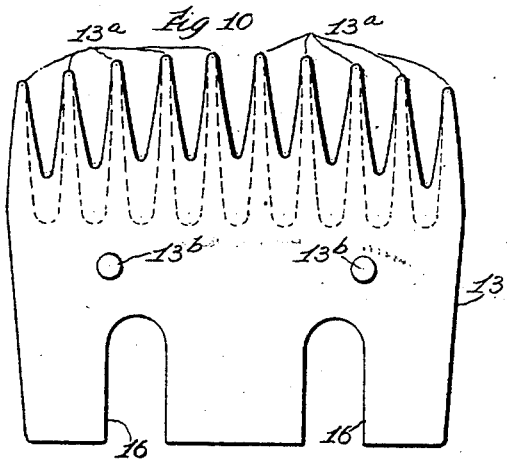
Inventor.
Franciss G. W. Bristow.
by Burton & Burton
his Attorneys.

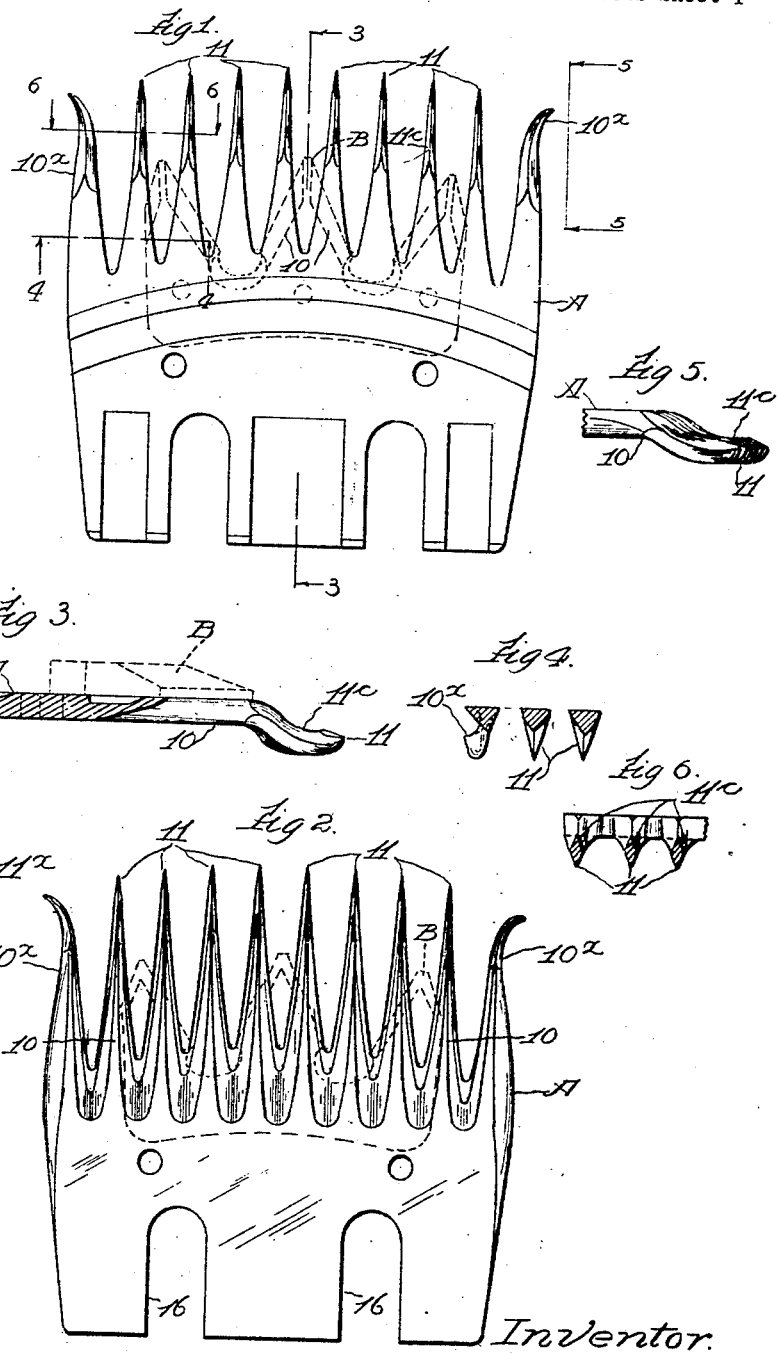

Patented Dec. 29, 1925.

1,567,110

UNITED STATES PATENT OFFICE.

FRANCISS G. W. BRISTOW, OF SYDNEY, AUSTRALIA.

SHEEP SHEAR.

Application filed April 9, 1925. Serial No. 21,805.

*To all whom it may concern:*

Be it known that I, FRANCISS G. W. BRISTOW, a subject of the King of Great Britain, and a resident of Sydney, Australia, have invented certain new and useful Improvements in Sheep Shears, of which the following is a specification, reference being had to the accompanying drawings, forming a part thereof.

The purpose of this invention is to provide an improved construction particularly with respect to the comb or fixed cutter member of a sheep shear or like tool such as a hair clipper adapted for avoiding too close shearing, affording easy penetration of the comb into the wool or hair without risk of scratching the pelt by reason of the fineness and consequent sharpness of the points of the comb teeth which are adapted by their fineness to afford the easy penetration. It consists in the elements and features of construction shown and described and as indicated in the claims.

In the drawings:—

Figure 1 is a top plan view of the comb or fixed cutter of a sheep shear embodying this invention.

Figure 2 is a bottom plan view of the same.

Figure 3 is a section at the line 3—3 on Figure 1.

Figure 4 is a section at the line 4—4 on Figure 1.

Figure 5 is an elevation as projected on a plane at the line 5—5 on Figure 1.

Figure 6 is a section at the line 6—6 on Figure 1.

Figure 7 is a view similar to Figure 2 showing a modification.

Figure 8 is a view similar to Figure 3 showing this modification.

Figure 9 is a section at the line, 9—9, on Figure 7.

Figure 10 is a top plan view of the lower plate in the form shown in Figure 7.

Figure 11 is a detail section at the line, 11—11, on Figure 9.

It has been found in practice a sheep shearing comb with its teeth straight has the following disadvantages:

First, the grinding bevel on the top of the teeth must be short to permit the cutter to advance on the comb as much as possible. Therefore, when the comb is ground, the bevel grinds away making the comb dangerous to shear with, though only partly worn out.

Secondly, the back bevel on the under part of the teeth at the point must be full and short as every time the comb gets ground after the top bevel is ground off, it gets lower and lower, and if lengthened in the first place when half worn out, it would instantly enter the skin injuring the sheep.

Third, the comb must be carried on the machine by the shearer at a sharp angle to prevent the back of the teeth touching the wool left on the sheep's body and gathering the yolk and dirt against the skin, clogging up the back of the comb and preventing it from traveling easily.

With this invention the following improvements are manifest, and the preceding defects overcome:

First, the teeth deflected down and then turned up at the extreme point beyond the cutting place of the comb prevents the top bevel from ever coming in contact with the grinder, even when the comb is quite worn out. In this way, the point entering the wool is always protected.

Secondly, through the deflection downwards and upwards of the extreme points of the teeth, the under bevel will never be affected by the grinding away of the top bevel and permits the lengthening out of the under bevel to any thickness the shearer may desire without in any way interfering with the practical efficiency of his comb, owing to the fact that his top bevel will never be ground away.

Thirdly, through the deflection downwards and then upwards of all the teeth, the comb need not be carried at as sharp an angle as is necessary with the straight comb, as the deflection carries the back of the comb off the cut wool and prevents to a great extent the clogging of the back of the comb with yolk on the same principle as the comb with its two outer teeth extended carries the remaining teeth. Whereas, a comb with its two outer teeth extended beyond the arc and deflected downwards cannot, owing to the extension travel under twisted horns. This comb with no extensions can travel in under horns close to the head and has all the advantages of that comb combined; with these advantages all the teeth points, top bevel are protected from the grinder. Whereas, the comb with only its two outer teeth deflected downwards has its two outer teeth protected. The remainder are not protected, but are ground away, a factor that is very detrimental to the value of the comb.

The comb or fixed cutter of this invention indicated as to its entirety by reference letter A, is, in general, characterized by the form of the comb teeth which, as to the first form illustrated, may be understood most clearly from Figure 3. The characteristic of the comb teeth, 10, consists in that from a point slightly forward of the sweep of the points of the teeth of the vibrating cutter, B, (shown in dotted line in the drawings,) the comb teeth are extended forwardly, the extensions, 11, being deflected downward and forward in a curve which as to the upper edge of the extensions is convex forwardly and upwardly and then forwardly with an upward curvature making the upper outline circumflex, first convex upwardly and forwardly and next concave upwardly and forwardly, the under or inner edge of the tooth extensions being curved first concave downwardly and rearwardly and then convex downwardly and rearwardly to the lowest point of deflection of the extension, and then continuing convex downwardly and forwardly as said lower edge curves upwardly to meet the upwardly and concavely curved upper edge in a blunted point which is above the lowest point of the extension, 11, which is above the apex of the downwardly convex curve of the lower edge a distance nearly half the total downward deflection of the lower edge of the toothed extension from the point at which the downward deflection begins. The toothed extension, 11, has its lateral edges beveled at the under side the bevel converging substantially to a knife edge throughout the entire circumflex extent of said lower edge of the extension, as may be seen in Figures 4 and 7; and the said extensions are also beveled at their upper edges at both sides the bevels converging upwardly to substantially a knife edge, 11ᶜ, as seen in Figures 5 and 6 and as indicated also in the plan view of Figure 1.

Except as to the outermost teeth which are further hereinafter particularly described, the extensions, 11, of all the comb teeth are substantially parallel as to their medial vertical planes, that is to say they do not extend in planes radial with respect to the sweep of the vibrating cutter except as to the middle teeth, and instead of extending thus radially they all have substantially the fore-and-aft direction of the middle teeth which alone are substantially radial to the sweep of the vibrating cutter. The obvious advantage of this form is that as the comb is advanced into the wool or hair of the animal, all the teeth advance in the direction of their length, whereas if they were all radial to the curved sweep of the cutter the teeth remote from the middle would tend to gather the wool or hair from a greater distance laterally than the teeth at the middle part of the comb and in consequence the stubble left by these outer teeth would be longer than that left by the middle teeth. It is desirable, however, for certain purposes to adapt the comb to gather the wool somewhat from an area somewhat wider than the sweep of the cutters, and for that purpose the outermost teeth, 10ˣ, have their extensions, 11ˣ, curved outwardly as seen in Figure 1. In other respects, however, the outermost teeth are entirely similar to the intermediate teeth, that is to say, the extensions, 11ˣ, have the same form as seen in side elevation as the intermediate teeth; the apex of the downwardly convex curve of the lower edge of these teeth is in the plane of the corresponding lines of the intermediate teeth and the terminal points of the extensions, 11ˣ, are in the arc of the terminals of the intermediate teeth. Also the extensions, 11ˣ, have the same form in cross section as intermediate teeth being beveled at both sides at their lower and upper edges so that they present substantially a blunted knife edge downwardly to the pelt and upwardly for the purpose for which all the teeth have this form as hereinafter explained.

Upon considering the form of the comb above described and the operation of the sheep shear or clipper having such comb, it may be understood that the teeth extensions being finished to a slightly blunted point at the forward ends and to a slightly blunted knife edge at the upper and lower edges, are adapted to enter and part the wool or hair with the minimum difficulty and minimum pull upon the hair tending to irritate the animal. Particularly it will be noticed that the form of the extensions shaped upwardly to a knife edge adapts them to part the tangled or interlocked fibers of the wool between and under which the points of the teeth have entered in the advancing of the shear, diminishing very materially the resistance to the advance and the pull upon the fibers tending to irritate the animal. It will be further observed that by reason of the downwardly convex curvature of the lower edge to the extensions the tilting of the comb more or less as it is advanced over the curves of the body of the animal subjected to the shearing action, does not cause the points of the extensions to reach the pelt so as to be liable to cut or scratch and that this avoidance is effected without in any respect diminishing the adaptation of the comb teeth to easily penetrate the thick or tangled wool as the shear is advanced.

In the form shown in Figures 8 and 9, the comb is made of two plates, an upper plate, 12, which has the comb teeth with their extensions in all respects conformed to the description already given of the form shown in the preceding figures. But this plate, 12, is only a little more than half the thickness of the entire comb and is supplemented by a second underlying plate, 13, which extends from the rear end of the comb to a point substantially at the commencement of the downward forward deflection of the toothed extensions indicated in these figures by reference character, 12ª. This underlying plate, 13, has the comb teeth, 13ª, conformed in all respects as to outline, to the overlying portion of the teeth of the upper comb plate, 12, to the limit of the extent of the teeth, 13ª, so that the lateral lines of the corresponding teeth of the two plates coincide. The plates, 12 and 13, are provided with means for preventing their relative displacement in their common planes of meeting. As illustrated and as most convenient, the means for this purpose consist of bosses, 13ᵇ, struck up from the lower plate, 13, at points registered with and adapting the bosses to enter the apertures, 12ᵇ, of the upper plate, 12, said apertures being provided in that plate for the usual purpose of being engaged by the bosses which are commonly present on the fixed body of the shear (not shown) for positioning the comb fixedly on the shear body. It will be understood that the plate, 13, is held to the plate, 12, by the usual means employed for securing the entire comb to the fixed body of the shear consisting of bolts which take through the slots or notches, 16, shown in the rear end of the comb which in this respect is of customary formation and designed to be applied to a shear body of customary formation for which reason the shear body and the means of attachment of the comb thereto are not illustrated or further described.

The specific purpose of making the comb consists of two plates as above described is that thereby the upper plate, which comprises the circumflex extensions of the teeth and which affords the shear edges back of these extensions, and which is ground from time to time on the upper surface for sharpening the shear edges, may be made of plate as thin as will afford fair margin of thickness for grinding and that the process of forming the comb with the teeth extensions described by usual stamping methods and dies can be performed more economically, both in respect to the actual process and as to cost of making and maintaining the necessary tools, than if the plate is of the full thickness; and since in any event the operating part of the comb must be discarded and replaced when the grinding of the upper surface for sharpening has lowered that surface a certain distance beyond which the proper relation between the reciprocating cutter and its actuator, and between the plane of shearing and the plane of bearing of the tooth extensions on the pelt would be disturbed or interfered with, the loss or cost of repair or replacement is greatly reduced by the division of the comb into two pieces only one of which has to be discarded and replaced, the plate, 13, being subject to practically no wear and not requiring replacements during the life of the tool as a whole.

I claim:—

1. In a sheep shear and the like in combination with a vibrating toothed cutter, a comb and fixed cutter member having the comb teeth severally, at points situated forwardly of the line of stroke of the points of the teeth of the vibrating cutter, flexed away from the plane of shearing contact of the vibrating cutter and the comb for terminating at a substantial distance from said plane; whereby the vibrating cutter is upheld and the plane of shearing is positioned at a distance from the pelt to insure adequate length of stubble.

2. In a sheep shear and the like in combination with a vibrating toothed cutter, a comb and fixed cutter member having the comb teeth all terminating substantially similarly with respect to the line of stroke of the points of the teeth of the vibrating cutter, and severally, at points situated forwardly of said line of stroke, flexed away from the plane of shearing contact of the vibrating cutter and the comb.

3. In the construction defined in claim 1, foregoing, the extension of the comb teeth being arcuate in planes transverse to the shearing plane.

4. In the construction defined in claim 1, foregoing, the extensions of the comb teeth being circumflex, first concave downward and forward, and then concave upward and forward, in planes transverse to the shearing plane.

5. In the construction defined in claim 1, foregoing, the extensions of the comb teeth being arcuate substantially in planes transverse to the shearing plane and all substantially parallel to such transverse plane radial with respect to the arc of vibration of the vibrating cutter at the middle point of the width of the comb.

6. In the construction defined in claim 1, foregoing, the extensions of the comb teeth being flexed bodily down away from the plane of shearing contact of the vibrating cutter and comb, and then forwardly to their terminals, rendering the upper edge of circumflex outline, and in cross-section at the forwardly extending terminal portion tapering narrowing from the front or upper edge back to the rear or under edge, and rounded at the forward terminal part of said lower edge substantially to a point; whereby said extensions constitute finely pointed comb teeth adapted for easily penetrating the wool to be gathered by said comb teeth to the cutter.

7. In the construction defined in claim 1, foregoing, the outermost comb teeth having their extensions flexed outwardly as well as downwardly, all of said extended teeth including the outermost, extending in the same plane substantially parallel to the plane of movement of the vibrating cutter.

8. In the construction defined in claim 1, foregoing, the outermost comb teeth being flexed outwardly as well as downwardly and being tapered narrowing horizontally forwardly and outwardly at the upper part, substantially to a point at the forward terminal.

9. In the construction defined in claim 1, foregoing, the outermost comb teeth being flexed outwardly as well as downwardly and being tapered narrowing horizontally forwardly and outwardly at their upper part, substantially to a point at the forward outward terminal, and being also tapered narrowing from above downward to the lower edge, whereby said lower edge at the forward and out-turned terminal point is substantially a blunt knife-edge, said edge being rounded upwardly toward the extremity for rendering the forward out-turned terminal of said outer teeth bluntly pointed for easy penetration of the wool for gathering it inwardly and back to the cutter.

10. In the construction defined in claim 1, foregoing, the comb teeth extensions beyond the sweep of the cutter teeth being laterally beveled at the upper side to a meeting line of the bevels whereby said extensions are adapted to easily part tangled or interlocked fibers of the wool penetrated by said extensions below their interlocking.

11. In the construction defined in claim 1, foregoing, a comb comprising an upper plate having the comb teeth with the extensions described, and a re-enforcing plate applied to the under side of said upper plate having rudimentary comb teeth extending under the teeth of the upper plate substantially to and terminating at the commencement of the downward deflection of said extensions, and means engaging the two plates with each other against relative displacement in their common plane of meeting.

In testimony whereof, I have hereunto set my hand at Chicago, Illinois, this 6th day of April, 1925.

FRANCISS G. W. BRISTOW.